UNITED STATES PATENT OFFICE.

SUMNER R. CHURCH, OF BROOKLYN, NEW YORK, ASSIGNOR TO BARRETT MANUFACTURING COMPANY, OF NEW YORK, N. Y., A CORPORATION OF WEST VIRGINIA.

WEATHER AND FLAME RESISTANT SHINGLE, &c., AND METHOD OF MAKING SAME.

1,155,130.   Specification of Letters Patent.   Patented Sept. 28, 1915.

No Drawing.   Application filed June 16, 1915.   Serial No. 34,485.

*To all whom it may concern:*

Be it known that I, SUMNER R. CHURCH, a citizen of the United States, residing in Brooklyn, county of Kings, and State of New York, have invented certain new and useful Improvements in Weather and Flame Resistant Shingles, &c., and Methods of Making Same, of which the following is a specification.

This invention relates to the treatment of fibrous materials generally and particularly to wood such as shingles and the like, which upon exposure to the elements become checked and warped and gradually decay with the resultant production of highly inflammable material, and has for its object imparting to said materials an extremely durable and attractive finish, which is not only waterproof but which is highly flame-resistant. As a result I am able to produce a material which will resist the inception or spread of conflagration and will preserve its original appearance and properties for periods greatly in excess of the normal life of such materials when untreated and exposed to the severe action of the weather.

I am aware that heretofore it has been proposed to fireproof materials of this general nature by means of chlorinated naphthalene, such for example as described in British Patent No. 7398 of 1898, German Patent 46201 of 1889, and United States Patents Nos. 914,300 and 914,222 of March 2, 1909, but such fireproofing does not serve to render the products treated sufficiently waterproof to preserve the same against checking, decay or warping upon exposure to the atmosphere, nor is it possible to obtain thereby an attractive finish upon the materials treated. The aforesaid chlorinated products of the prior art alone could not be practically used because of their solid form which require heat to liquefy them before application to the desired material. Even when so liquefied they do not sufficiently penetrate the wood fibers, and besides this pigments could not be satisfactorily incorporated therewith in order to produce a suitable stain or finish for wood and like fibrous materials. Moreover, the large quantity of these materials which is required by such method of application and the high cost of the materials themselves render such treatment almost prohibitive. If these chlorination products are dissolved in commercial solvents such as suggested in the aforesaid patents of the prior art, to wit, naphtha, chloroform or carbon tetrachlorid, the amount of the same which is contained in the saturated solution is so limited, owing to the difficult solubility of these products in such solvents, that the solutions are wholly unsatisfactory for waterproofing or fireproofing to the desired degree, such wood products, especially shingles, which latter as is known gradually become highly inflammable owing to the furred or moss-like surfaces produced by prolonged exposure to the elements. Moreover, when applied in such solutions to shingles or surfaces of other fibrous materials such as fiber boards, and the like used for decorative purposes, chlorinated naphthalene often crystallizes out in irregular blotches or patches upon the surface, rendering to the same an unsightly appearance which makes it wholly unsuitable for general use, as an attractive finish is not only desired but is essential in order to make these products commercially salable.

My experiments and investigations have led to the discovery that when suitable waxy bodies, such for example as wax-tailings, are mixed with such bodies as hexachlornaphthalene, not only does the latter become sufficiently soluble in the aforesaid commercial solvents, and particularly in a mixture of heavy coal tar naphtha and carbon tetrachlorid, as hereinafter described, so as to render the same suitable for superficial application to shingles, wood, fiber board and other suitable fibrous materials, and to impart to the same satisfactory fireproofing as well as preservative qualities as hereinafter described, but that it is also possible to produce a remarkable and extremely durable and attractive finish upon wood and other fibrous materials. These results have heretofore been considered impossible of achievement with any known materials upon wood especially.

The aforesaid product of the combination of the chlornaphthalene body such as hexachlornaphthalene, with wax tailings, is entirely homogeneous. It is much more unctuous and fluent than hexachlornaphthalene alone. Moreover, the tendency of hexachlornaphthalene or like bodies to crystallize out of solution or to irregularly deposit in crystalline form upon the surfaces of wood or fibrous materials treated therewith, is entirely obviated when a requisite quantity of wax tailings is employed. As a result of my invention moreover, it is possible to incorporate pigments ground in oil with such chlorination products whereby the pleasing appearances and color of the best quality of creosote stains, as well as the highest degree of preservative, waterproofing and fireproofing properties can be obtained. In addition to this the aforesaid mixture has a viscosity which exceeds that of the ordinary stains, and in this respect substantially differs from the straight solution of hexachlornaphthalene in the commercial solvents as above mentioned, and owing to the large content of the solids therein, it is possible to satisfactorily paint or superficially apply the same to fibrous materials such as wood, and the like, in which it is desired to retain as much as possible the coating upon the surface and prevent excessive penetration of the same into the fibers.

The following is an example of the procedure in accordance with my invention:—

1,000 lbs. chlorinated naphthalene (substantially hexachlornaphthalene) and 350 lbs. of wax-tailings, are first fused together while constantly stirred in a suitable vessel heated in any suitable manner as by means of a steam jacket or steam coils, to a temperature of from 120° to 150° C. After these materials have been completely fused or melted the temperature thereof is lowered to about 100° C. and the melt is digested with a solvent mixture comprising 320 lbs. heavy coal tar naphtha and 135 lbs. of carbon tetrachlorid. For the digestion step it is preferable that the vessel be provided with the well known return-condenser and to keep the temperature of the mixture below 80° to 90° C. After the digestion is completed the mixture is cooled to room-temperature and the resultant product is ready for use.

The aforesaid wax tailings possess the peculiar properties of serving as what might be termed a semisolid or fixed solvent for the hexachlornaphthalene and as a consequence there is a marked increase in the percentage of such hexachlornaphthalene in solution in the volatile solvents employed over that obtainable by the direct solution in volatile solvents alone. For example, the heavy coal tar naptha therein referred to, which product has been found to possess the highest solvent power of any common solvent, will dissolve substantially equal parts by weight of hexachlornaphthalene, but on the other hand, as shown by the foregoing formula, a homogeneous solution of the chlorination product is obtained which contains 220 parts of chlorinated naphthalene to every 100 parts of volatile solvent. In addition to this there are substantially 77 parts of waxy tailings in the fixed or non-volatile product making a total of 297 parts of such non-volatile ingredients to every 100 parts of volatile solvents. This saturated solution of hexachlornaphthalene-wax tailings in heavy coal tar naphtha and carbon tetrachlorid is so viscous and contains such a high proportion of non-volatile ingredients, that upon evaporation of the solvent a sufficient body of wax is left in the fiber and on the surface of the shingle to render it not only waterproof but highly fire-resistant. Moreover, the treated material, has, as previously stated, an extraordinarily pleasing appearance which appearance is preserved for long periods of time even upon exposure to the drastic action of the weather.

The wax-tailings herein referred to is generally obtained from the destructive distillation of so-called petroleum tar. It is a very sticky material, varying from yellow to a greenish color. It is extremely resistant to oxidation, and owing to the high temperature at which it is produced, is very non-volatile in character.

Heavy coal tar naphtha herein referred to comprises the product obtained by refining distillates from coal tar or water gas tar. It boils substantially between 130° and 200° C.

While my preferred fixed (i. e. non-volatile) solvent comprises preferably wax tailings, because of the very remarkable results obtained therewith, as hereinbefore described, the expression "combustible wax product" as used in the annexed claims, is intended to include other fixed or non-volatile solvents of hexachlornaphthalene which substantially correspond in their properties to the herein described properties of wax-tailings and which are capable of serving as suitable substitutes for such wax tailings as solid or fixed solvents of hexachlornaphthalene in the manufacture of weather and flame resistant fibers such as shingles, etc. as herein described.

Having thus described my invention, what I claim and desire to secure by Letters Patent is:—

1. The method of preserving fibrous materials which consists in applying to the same a mixture comprising an incombustible waxy body and a combustible waxy body the latter serving as a non-volatile solvent of the former.

2. The method of preserving fibrous materials which consists in applying to the same a composition comprising an incombustible waxy body, a combustible waxy body, the latter serving as a non-volatile solvent of the former, and a volatile solvent for both.

3. The method of preserving fibrous materials which consists in applying to the same a composition comprising an incombustible waxy body, a combustible waxy body, the latter serving as a non-volatile solvent of the former, said mixture containing a volatile solvent for both of said products, and a pigment.

4. The method of preserving fibrous materials which consists in applying to the same a composition containing chlorinated naphthalene and wax tailings.

5. The method of preserving fibrous materials which consists in applying to the same a composition comprising hexachlornaphthalene and wax tailings, the latter serving as a non-volatile solvent of the former.

6. The method of preserving fibrous materials which consists in applying to the same a mixture comprising hexachlornaphthalene, wax tailings and a volatile wax-solvent.

7. The method of preserving articles of wood which consists in applying to the same a colored mixture comprising hexachlornaphthalene wax tailings, and a volatile wax-solvent.

8. Fiber combined with a mixture consisting of an incombustible waxy body and a combustible waxy body, the latter serving as a fixed non-volatile solvent for the former.

9. Fiber combined with a mixture consisting of an incombustible waxy body, a combustible waxy body, the latter serving as a fixed non-volatile solvent for the former, and a pigment.

10. Wood combined with a mixture consisting essentially of chlorinated naphthalene and wax tailings, the latter serving as a fixed non-volatile solvent of the former.

11. Wood coated with a composition of hexachlornaphthalene and a combustible waxy product, the latter serving as a fixed non-volatile solvent of the former.

12. Wood treated with a composition consisting essentially of hexachlornaphthalene and wax tailings, the latter serving as a fixed non-volatile solvent of the former.

13. The method of preserving shingles which consists in applying to the same a colored mixture comprising hexachlornaphthalene wax tailings, and a volatile wax-solvent.

14. Shingle combined with a mixture consisting of an incombustible waxy body and a combustible waxy body, the latter serving as a fixed non-volatile solvent for the former.

In witness whereof I have hereunto set my hand at the city, county and State of New York, this 15 day of June, 1915.

SUMNER R. CHURCH.